(12) United States Patent
Vadala, Jr. et al.

(10) Patent No.: US 7,364,677 B2
(45) Date of Patent: Apr. 29, 2008

(54) IN-MOLD DECORATED ARTICLES AND METHODS

(75) Inventors: Joseph P. Vadala, Jr., Leominster, MA (US); Levi A. Kishbaugh, Groveland, MA (US); Kevin J. Levesque, Andover, MA (US); David E. Pierick, San Diego, CA (US)

(73) Assignee: Trexel, Inc., Woburn, MA (US)

( * ) Notice: Subject to any disclaimer, the term of this patent is extended or adjusted under 35 U.S.C. 154(b) by 314 days.

(21) Appl. No.: 10/849,277

(22) Filed: May 18, 2004

(65) Prior Publication Data

US 2004/0212118 A1 Oct. 28, 2004

Related U.S. Application Data

(62) Division of application No. 09/676,251, filed on Sep. 29, 2000, now abandoned.

(51) Int. Cl.
*B29C 44/06* (2006.01)
(52) U.S. Cl. .............. 264/46.4; 264/46.6; 264/50; 264/53; 264/257
(58) Field of Classification Search .......... 264/53, 264/257, 46.4, 46.6, 50
See application file for complete search history.

(56) References Cited

U.S. PATENT DOCUMENTS 3,219,597 A 11/1965 Boutillier et al.

(Continued)

FOREIGN PATENT DOCUMENTS

DE 43 14 869 A1 11/1994

(Continued)

OTHER PUBLICATIONS

Baldwin, D.F. et al., "A Processing system for the Extrusion of Microcellular Polymer Sheets: Shaping and Cell Growth Control," Cellular and Microcellular Materials 53:85-107, 1994.

(Continued)

*Primary Examiner*—Allan R. Kuhns
(74) *Attorney, Agent, or Firm*—Wolf, Greenfield & Sacks, P.C.

(57) ABSTRACT

The invention provides in-mold decorated articles and methods to form the articles. The in-mold decorated articles include a polymeric portion having a substrate material adhered to a surface of the polymeric portion. The substrate material may be, for example, a film or a fabric. In some embodiments, the polymeric portion may be a foam and, particularly, a microcellular polymeric material. The articles are formed by injecting a mixture of blowing agent and polymeric material into a mold cavity in which the substrate material is disposed, so that the substrate material is forced against a wall of the mold cavity. The blowing agent, which in certain preferred cases is a supercritical fluid, decreases the viscosity of the polymeric material and, therefore, enables reductions in injection pressures and temperatures. Reduced injection temperature and pressure may widen the processing window, increase flexibility in the selection of substrate materials, and can eliminate the need for a barrier layer that is sometimes used in conventional processes. The method may be used to produce a variety of in-mold decorated articles.

20 Claims, 4 Drawing Sheets

U.S. PATENT DOCUMENTS

| | | | |
|---|---|---|---|
| 3,227,664 A | 1/1966 | Blades et al. | |
| 3,227,784 A | 1/1966 | Blades et al. | |
| 3,251,911 A | 5/1966 | Hansen | |
| 3,277,221 A | 10/1966 | Parrish | |
| 3,375,211 A | 3/1968 | Parrish | |
| 3,375,212 A | 3/1968 | Bonner et al. | |
| 3,384,531 A | 5/1968 | Parrish | |
| 3,436,446 A | 4/1969 | Angell, Jr. | |
| 3,584,090 A | 6/1971 | Parrish | |
| 3,637,458 A | 1/1972 | Parrish | |
| 3,697,204 A | 10/1972 | Kyritsis et al. | |
| 3,773,873 A | 11/1973 | Spaak et al. | |
| 3,787,543 A | 1/1974 | Parrish | |
| 3,812,225 A | 5/1974 | Hosoda et al. | |
| 4,086,384 A | 4/1978 | Adelman et al. | |
| 4,096,218 A | 6/1978 | Yasuike et al. | |
| 4,124,308 A | 11/1978 | Sokolow | |
| 4,229,395 A | 10/1980 | Nagumo et al. | |
| 4,263,360 A | 4/1981 | Adelman | |
| 4,323,528 A | 4/1982 | Collins | |
| 4,381,272 A | 4/1983 | Ehritt | |
| 4,473,665 A | 9/1984 | Martini-Vvedensky et al. | |
| 4,479,914 A | 10/1984 | Baumrucker | |
| 4,569,950 A | 2/1986 | Hoshi et al. | |
| 4,652,495 A * | 3/1987 | Sato et al. | 428/425.5 |
| 4,761,256 A | 8/1988 | Hardenbrook et al. | |
| 4,783,292 A | 11/1988 | Rogers | |
| 4,783,295 A | 11/1988 | Kearns et al. | |
| 4,791,144 A | 12/1988 | Nagou et al. | |
| 4,806,094 A | 2/1989 | Rhodes, Jr. et al. | |
| 4,961,983 A | 10/1990 | Smorada et al. | |
| 5,034,171 A | 7/1991 | Kiczek et al. | |
| 5,098,267 A | 3/1992 | Cheng | |
| 5,110,998 A | 5/1992 | Muschiatti | |
| 5,124,095 A | 6/1992 | Gianni et al. | |
| 5,128,382 A | 7/1992 | Elliott, Jr. et al. | |
| 5,149,579 A | 9/1992 | Park et al. | |
| 5,158,986 A | 10/1992 | Cha et al. | |
| 5,160,674 A | 11/1992 | Colton et al. | |
| 5,182,307 A | 1/1993 | Kumar | |
| 5,227,103 A | 7/1993 | Muschiatti | |
| 5,294,386 A * | 3/1994 | Roth et al. | 264/46.6 |
| 5,334,356 A | 8/1994 | Baldwin et al. | |
| 5,358,675 A | 10/1994 | Campbell et al. | |
| 5,456,976 A | 10/1995 | LaMarca, II et al. | |
| 5,500,450 A | 3/1996 | Simandl et al. | |
| 5,540,963 A | 7/1996 | Wong | |
| 5,571,848 A | 11/1996 | Mortensen et al. | |
| 5,629,014 A | 5/1997 | Kwiatek et al. | |
| 5,670,102 A | 9/1997 | Perman et al. | |
| 5,684,055 A | 11/1997 | Kumar et al. | |
| 5,830,393 A | 11/1998 | Nishikawa et al. | |
| 5,851,617 A | 12/1998 | Keiser | |
| 5,866,053 A | 2/1999 | Park et al. | |
| 5,897,011 A | 4/1999 | Brilliant et al. | |
| 5,948,711 A | 9/1999 | Closson | |
| 5,955,511 A | 9/1999 | Handa et al. | |
| 6,146,577 A | 11/2000 | Yamaki et al. | |
| 6,171,419 B1 * | 1/2001 | Heiman et al. | 156/78 |
| 6,232,354 B1 | 5/2001 | Tan | |
| 6,235,380 B1 | 5/2001 | Tupil et al. | |
| 6,676,866 B2 * | 1/2004 | Harris et al. | 264/46.4 |

FOREIGN PATENT DOCUMENTS

| | | |
|---|---|---|
| EP | 0 228 016 A1 | 7/1987 |
| EP | 0 453 687 A1 | 10/1991 |
| EP | 0 463 759 A2 | 1/1992 |
| EP | 0 465 317 A2 | 1/1992 |
| EP | 0 610 953 A1 | 8/1994 |
| EP | 0 707 935 A2 | 4/1996 |
| EP | 0 799 853 A1 | 10/1997 |
| EP | 0 818 292 A2 | 1/1998 |
| EP | 0 914 919 A1 | 5/1999 |
| JP | 58 197029 | 11/1983 |
| JP | 63 268624 A | 11/1988 |
| JP | 08 085129 | 4/1996 |
| WO | WO 89/00918 | 2/1989 |
| WO | WO 90/07546 | 7/1990 |
| WO | WO 95/24440 | 9/1995 |
| WO | WO 96/13368 | 9/1996 |
| WO | WO 98/08667 | 3/1998 |
| WO | WO 98/31521 | 7/1998 |
| WO | WO 99/04968 A2 | 2/1999 |

OTHER PUBLICATIONS

International Search Report for PCT/US01/42396.

Park, C.B. et al., "Effect of the Pressure Drop Rate on Cell Nucleation in Continuous Processing of Microcellular Polymers," Polymer Engineering and Science, 35:432-440, 1995.

Park, C.B. et al. "Filamentary Extrusion of Microcellular Polymers Using a Rapid Decompressive Element," Polymer Engineering & Science, 36:34-48, 1996.

Park, C.B. et al., "Rapid Polymer/Gas Solution Formation for Continuous Production of Microcellular Plastics," Journal of Manufacturing Science and Engineering, New York, 118:639-645, Nov. 1996.

* cited by examiner

IN-MOLD DECORATED ARTICLES AND METHODS

RELATED APPLICATIONS

This application is a divisional of U.S. patent application Ser. No. 09/676,251, filed Sep. 29, 2000 now abandoned, entitled "In-Mold Decorated Articles And Methods".

FIELD OF THE INVENTION

The present invention relates generally to injection molding of polymeric materials and, more particularly, to in-mold decorated articles and methods for producing the articles.

BACKGROUND OF THE INVENTION

Polymeric materials may be processed to form articles having a number of different shapes and sizes. Conventional polymer processing techniques include injection molding, extrusion, and blow molding. Injection molding generally involves injecting molten plastic into a mold cavity, cooling the molten plastic, and opening the mold to produce an injected molded article having a shape similar to the mold cavity.

In some cases, it may be desirable to adhere a substrate material to an exterior surface of a polymeric article. Such substrates may be used to enhance the appearance of the article and/or to improve properties (e.g., stiffness) of the article. Exemplary substrate materials include films and fabrics.

In-mold decorating techniques produce molded articles which include a substrate adhered to a surface of the article. These techniques typically involve placing a substrate within the mold cavity so that molten polymer injected into the mold forces the substrate material against a mold wall. When the polymer cools, it adheres to the substrate material. The mold may be opened to produce a molded article having a substrate on its exterior surface.

Conventional in-mold decorating techniques typically involve injecting molten polymer at high temperatures and pressures into the mold to ensure adequate filling and/or sufficient adherence of the substrate to the plastic molded article. However, these conditions may damage certain types of substrates. For example, film substrates may shrink or crack as a result of high temperatures. Furthermore, when fabric substrates are used, a barrier layer may be required to prevent polymer from bleeding through the fabric as a result of high injection pressures. The barrier layer may add to the cost of producing the injection molded article and may reduce the adherence of the fabric to the polymeric material.

Accordingly, there is a need for improved in-mold decorated articles and a method to produce the articles.

SUMMARY OF THE INVENTION

The invention provides in-mold decorated articles and methods to form the articles. The in-mold decorated articles include a polymeric portion having a substrate material adhered to a surface of the polymeric portion. The substrate material may be, for example, a film or a fabric. In some embodiments, the polymeric portion may be a foam and, particularly, a microcellular polymeric material. The articles are formed by injecting a mixture of blowing agent and polymeric material into a mold cavity in which the substrate material is disposed, so that the substrate material is forced against a wall of the mold cavity. The blowing agent, which in certain preferred cases is a supercritical fluid, decreases the viscosity of the polymeric material and, therefore, enables reductions in injection pressures and temperatures. Reduced injection temperature and pressure may widen the processing window, increase flexibility in the selection of substrate materials, and can eliminate the need for a barrier layer that is sometimes used in conventional processes. The method may be used to produce a variety of in-mold decorated articles.

In one aspect, the invention provides an in-molded decorated article. The article includes an injection-molded microcellular polymeric material having an average cell size of less than 100 microns, and a substrate adhered to a surface of the microcellular polymeric material.

In another aspect, the invention provides an in-mold decorated article. The article includes an injection-molded polymeric foam material wherein at least 70% of the total number of cells have a cell size of less than 150 microns, and a substrate adhered to a surface of the polymeric foam material.

In another aspect, the invention provides an in-mold decorated article. The article includes an injection-molded polymeric material and a single-layer fabric substrate adhered to a surface of the polymeric material.

In another aspect, the invention provides an in-mold decorated article. The article includes an injection-molded polymeric material having a softening temperature, and a substrate adhered to a surface of the injection molded polymeric material. The substrate includes a polymer having a softening temperature within 20° C. of the softening temperature of the injection molded polymeric material.

In another aspect, the invention provides a method for forming an in-mold decorated article. The method includes molding a fluid polymeric material against a substrate, and allowing the fluid polymeric material to harden and adhere to the substrate as a microcellular polymeric material having an average cell size of less than 100 microns.

In another aspect, the invention provides a method for forming an in-mold decorated article. The method includes positioning a substrate material within a mold cavity and introducing a physical blowing agent into polymeric material in a polymer processing apparatus. The method further includes mixing the blowing agent and the polymeric material under conditions at which the blowing agent is a supercritical fluid, and injecting a mixture of polymeric material and blowing agent into the mold cavity.

In another aspect, the invention provides a method for forming an in-mold decorated article. The method includes providing a polymer molding system including an extruder, a mold, and a substrate disposed within a cavity of the mold. The system is constructed and arranged to deliver blowing-agent-free molten polymeric material from the extruder into the mold cavity at a minimum injection pressure and to solidify the polymeric material in the mold to form an in-mold decorated article having the substrate adhered to a surface of a polymeric material portion. The method further includes delivering polymeric material admixed with a blowing agent from the extruder into the mold cavity, at an injection pressure of less than 95% of the minimum injection pressure, and solidifying the polymeric material in the mold to form an in-mold decorated article having the substrate adhered to a surface of a polymeric material portion.

Other advantages, aspects, and features of the invention will become apparent from the following detailed description of the invention when considered in conjunction with the accompanying drawings.

DETAILED DESCRIPTION

The invention provides an in-molded decorated article and a method for producing the article. The method includes introducing a blowing agent into polymeric material in a polymer processing apparatus to form a mixture of blowing agent and polymeric material having a reduced viscosity relative to the polymeric material. The mixture is injected into a mold cavity in which a substrate material is positioned. The substrate is forced against the mold wall and the mixture is cooled to form an in-mold decorated article having a substrate covering a polymeric portion of the article. As described further below, the polymeric portion of the article may be a polymeric foam and, in particular, a microcellular polymeric material.

Figure 1A:
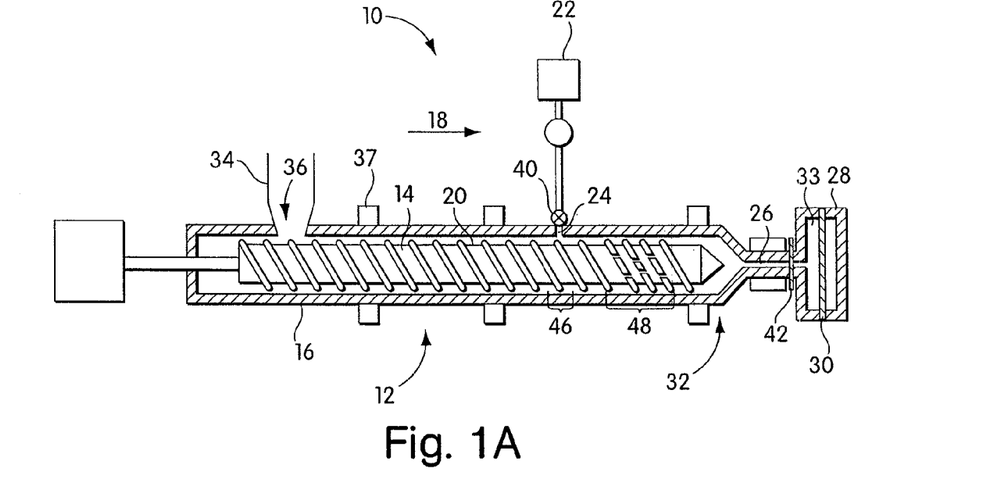
FIG. 1A schematically illustrates an injection molding system at the beginning of a molding cycle used to produce in-mold decorated articles according to a method of the present invention.
Figure 1B:
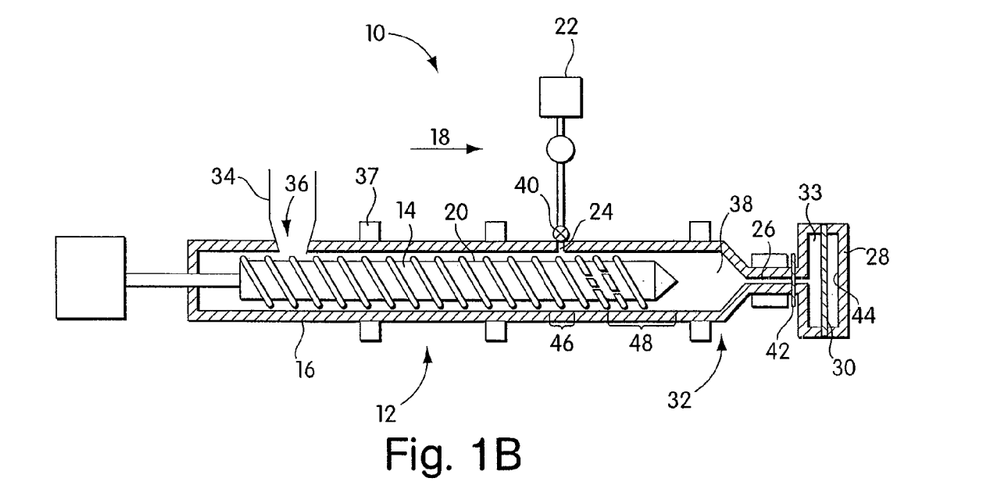
FIG. 1B schematically illustrates the injection molding system of FIG. 1A after a charge of polymeric material and blowing agent has been accumulated.
Figure 1C:
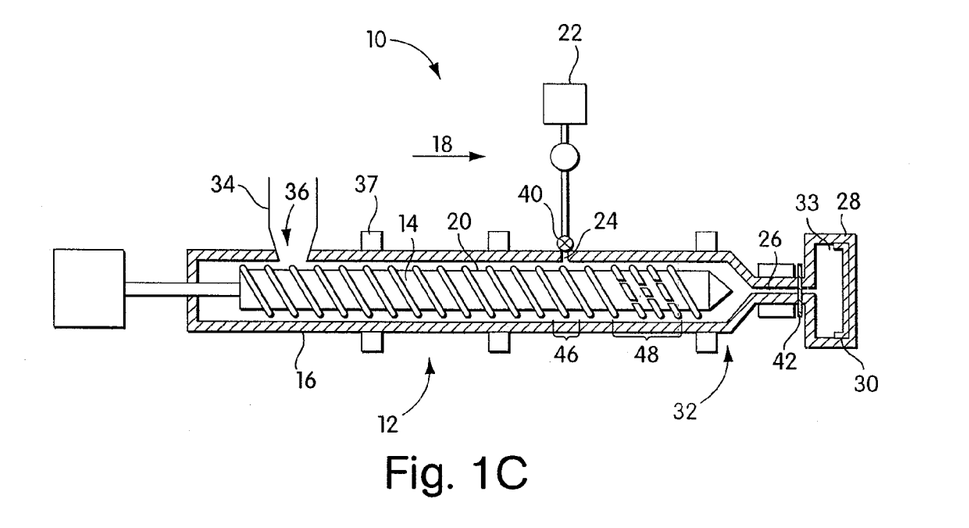
FIG. 1C schematically illustrates the injection molding system of FIG. 1A after the charge of polymeric material and blowing agent has been injected into the mold to form the in-mold decorated article.

Referring to FIGS. 1A-1C, an injection molding system 10 is used to produce an in-mold decorated article according to one method of the present invention. An extruder 12 of molding system 10 includes a polymer processing screw 14 that is rotatable within a barrel 16 to convey polymeric material in a downstream direction 18 within a polymer processing space 20 defined between the screw and the barrel. A source 22 of blowing agent is connected to a blowing agent port 24 formed within the barrel to introduce blowing agent into the polymeric material, as described further below. Extruder 12 includes an outlet 26 of the extruder, for example a gate, connected to an injection mold 28 in which a substrate material 30 is positioned.

Generally, injection molding system 10 operates cyclically to produce a series of in-mold decorated articles. At the beginning of a typical molding cycle, screw 14 is positioned at a downstream end 32 of barrel 16 as illustrated in FIG. 1A. Polymeric material, typically in pelletized form, is fed into polymer processing space 20 from a hopper 34 through an orifice 36. Barrel 16 may be heated by one or more heating units 37. Screw 14 rotates to plasticate polymeric material and to convey the polymeric material in downstream direction 18. Blowing agent is introduced into the polymeric material from source 22 through blowing agent port 24 to form a mixture of blowing agent and polymeric material in processing space 20. The mixture is conveyed downstream by the rotating screw and accumulated in a region 38 within the barrel downstream of the screw. The accumulation of the mixture in region 38 creates a pressure that forces the screw axially in an upstream direction in the barrel. After a sufficient charge of the mixture has been accumulated, screw 14 ceases to rotate and stops moving in the upstream direction (FIG. 1B). Preferably, when the screw no longer plasticates polymeric material the flow of blowing agent into the polymeric material may be stopped, for example, by the operation of a shut-off valve 40 associated with the blowing agent port. Then, the screw is moved axially in a downstream direction to downstream end 32 of the barrel (FIG. 1C) to inject the accumulated charge of the mixture through outlet 26 of the extruder and into a cavity 33 of mold 28. A valve 42 associated with the outlet of the extruder typically is opened to permit the mixture to flow into the mold. The injected mixture forces substrate 30 against a mold wall 44. The mixture of polymeric material and blowing agent is cooled in the mold, after which the mold is opened to produce an in-mold decorated article 60 (FIG. 3) having a substrate formed integral with the molded polymeric portion.

In some embodiments, it may be preferable to form a single-phase solution of polymeric material and blowing agent within polymer processing space 20 and to maintain the single-phase condition until the solution is injected into mold 28, particularly when the polymeric portion of the in-mold decorated article is a microcellular material.

To aid in the formation of the single-phase solution, blowing agent introduction may be done through a plurality of blowing agent ports 24 arranged in the barrel, though it should be understood that a single port may also be utilized to form a single-phase solution. When multiple ports 24 are utilized, the ports can be arranged radially about the barrel or in a linear fashion along the axial length of the barrel. An arrangement of ports along the length of the barrel can facilitate injection of blowing agent at a relatively constant location relative to the screw when the screw moves axially (in an upstream direction) within the barrel as the mixture of polymeric material and blowing agent is accumulated. Where radially-arranged ports are used, ports 24 may be placed at the 12:00 o'clock, 3:00 o'clock, 6:00 o'clock and 9:00 o'clock positions about the extruder barrel, or in any other configuration as desired. Blowing agent port 24 may include a single orifice or a plurality of orifices. In the multi-orifice embodiments (not illustrated), the port may include at least about 2, and some cases at least about 4, and others at least about 10, and others at least about 40, and others at least about 100, and others at least about 300, and others at least about 500, and in still others at least about 700 blowing agent orifices. In another embodiment, port 24 includes an orifice containing a porous material that permits blowing agent to flow therethrough and into the barrel, without the need to machine a plurality of individual orifices.

To further promote the formation of a single-phase solution, blowing agent port 24 may be located at a blowing agent injection section 46 of the screw. The blowing agent injection section of the screw may include full, unbroken flight paths. In this manner, each flight, passes or "wipes" the blowing agent port including orifices periodically, when the screw is rotating. This wiping increases rapid mixing of blowing agent and polymeric material in the extruder and the result is a distribution of relatively finely divided, isolated regions of blowing agent in the polymeric material immediately upon injection into the barrel and prior to any mixing. This promotes formation of a uniform polymer and blowing agent mixture which may be desired in certain types of polymeric processing including microcellular processing.

Downstream of the blowing agent injection section, the screw may include a mixing section 48 which has highly broken flights to further mix the polymer and blowing agent mixture to promote formation of a single-phase solution.

In some embodiments in which a single-phase solution of polymeric material and blowing agent is formed, it may be preferable to nucleate the solution when injecting into mold 28. Nucleation is achieved via a pressure drop, for example, that occurs when the solution passes through outlet 26 (e.g., a gate) which functions as a nucleating pathway. The nucleated sites in the solution grow into cells within the mold to form a polymeric foam material. In some cases, the cell nucleation rate and growth may be controlled to form a microcellular polymeric material as described in International Publication No. WO 98/31521 (Pierick et. al.) which is incorporated herein by reference. Particularly, nucleating pathways (e.g. gates) that provide a high pressure drop rate, for example greater than 0.1 GPa/s, may be utilized to form microcellular materials in certain cases.

It should be understood that injection molding system 10 may be any suitable type known in the art. Examples of suitable injection molding systems, particularly when microcellular polymeric material are being produced, have been described, for example, in International Publication No. WO 98/31521 (Pierick et. al.) referenced above. Similarly, the in-mold decorating method of the present invention and the injection molding system 10 may have any number of variations known to one of ordinary skill in the art. For example, the methods and systems may utilize a separate accumulator external of the barrel to accumulate the mixture of polymeric material and blowing agent prior to injection into the mold. The methods and systems may also use a tandem extruder having a primary and secondary extruder.

Figure 2A:
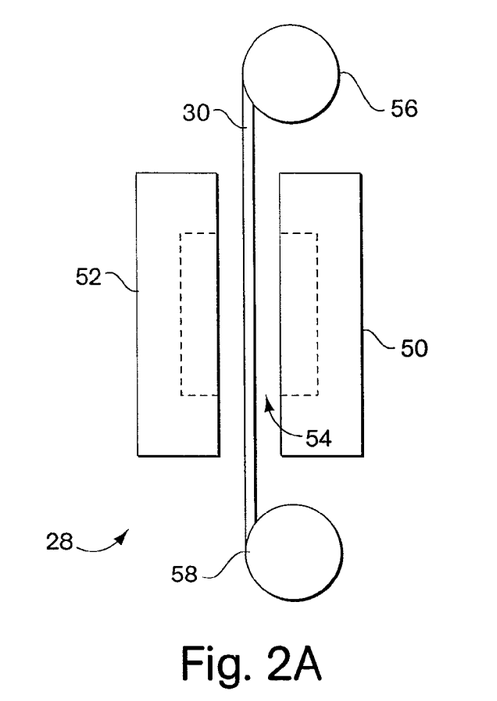
FIGS. 2A and 2B schematically illustrate an injection mold and an assembly for providing a continuous sheet of substrate material to the mold when the mold is open and when the mold is closed, respectively.
Figure 2B:
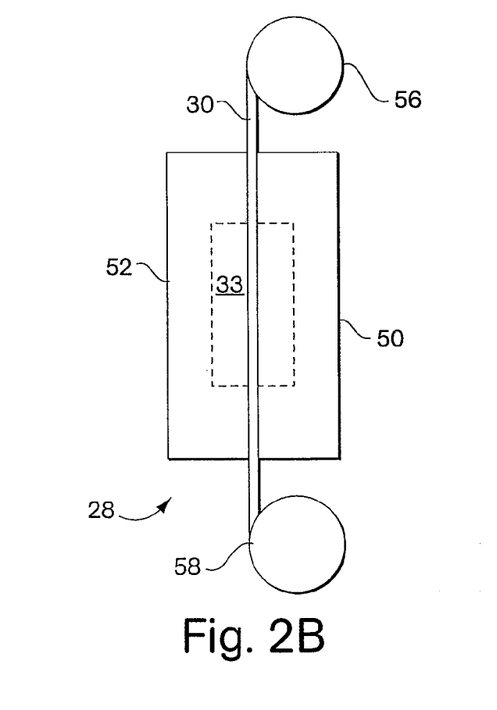

Referring to FIGS. 2A-2B, substrate material 30 is provided as a continuous sheet according to one embodiment of the present invention. At the beginning of a mold cycle, a first mold half 50 is separated from a second mold half 52 to provide a space 54 therebetween (FIG. 2A). A continuous sheet of substrate material 30 extends from a delivery roll 56 to a take-up roll 58 through space 54. Mold halves 50, 52 are closed on peripheral portions of the continuous sheet so that substrate 30 is held across mold cavity 33 (FIG. 2B). As described above, a mixture of polymeric material and blowing agent is injected into mold cavity 33 and sufficiently cooled, after which mold halves 50, 52 separate so that the article may be removed from the mold. Rolls 56, 58 operate to provide a new portion of continuous sheet between the mold halves, and the process is repeated to produce additional in-mold decorated articles.

It should be understood that substrate 30 may be provided according to any other technique known to one of ordinary skill in the art. For example, individual sheets of substrate material may be positioned within mold cavity 33 after each respective molding cycle. Also, substrate 30 may only extend across a portion of mold cavity 33 to provide in-mold decorated articles with substrate material covering selective regions of the article surface.

The introduction of a physical blowing agent into the polymeric material in the method of the present invention reduces the viscosity of the polymeric material. The reduction in viscosity improves the flow of the mixture into the mold which can allow a decorated article to be molded at relatively low injection temperatures and pressures. As used herein, "injection pressure" is defined as the pressure of the polymeric material entering the mold cavity. The injection pressure is also related to the "hydraulic pressure" which, as used herein, is defined as the pressure of fluid (e.g., oil) used to provide the force that pushes the screw forward during the injection period of a molding cycle. Thus, the method of the invention also provides a reduction in hydraulic pressure. As used herein, "injection temperature" is defined as the melt temperature of the polymeric material entering the mold cavity. Conventional in-mold decorating processes generally require relatively high injection pressures (and hydraulic pressures) and temperatures to adequately fill the mold and, in some cases, to sufficiently impregnate the substrate to provide adequate adherence between the polymeric material and the substrate (e.g., between polymeric material and a fabric substrate). However, high injection pressures and injection temperatures may damage the substrate and can thus limit the types of substrates which are suitable. By lowering the injection temperature and pressure required, the present method advantageously expands the type of substrates that can be used as described further below.

In some cases, the injection pressure in the present method may be reduced by at least 100 psi as compared to the injection pressure required for a polymeric material with no physical blowing agent under otherwise similar processing conditions. In some cases, the injection pressure is reduced by at least 200 psi, in other cases by at least 500 psi, and in still other cases by at least 1000 psi, as compared to polymeric material with no physical blowing agent under similar processing conditions. In some cases, the injection pressure in the present method may be less than about 95% of the injection pressure, in other cases less than about 80% and in other cases less than about 70%, of the injection pressure required using a polymeric material with no physical blowing agent under otherwise similar processing conditions. Similarly, the injection temperature may be reduced relative to the injection temperature required for a polymeric material with no physical blowing agent under otherwise similar processing conditions. In some cases, the injection temperature is reduced by at least 10° C., in other cases by at least 30° C., and in other cases by at least 50° C. as compared to polymeric material with no physical blowing agent under similar processing conditions.

The physical blowing agent utilized in the methods of the present invention may have any suitable composition known in the art including nitrogen, carbon dioxide, hydrocarbons, chlorofluorocarbons, noble gases and the like, or mixtures thereof. The blowing agent may be introduced into the polymeric material in any flowable state, for example, a gas, liquid, or supercritical fluid. Preferably, once introduced into the polymeric material in the extruder, the blowing agent is in a supercritical state. That is, the blowing agent is a supercritical fluid under the temperature and pressure conditions within the extruder. Supercritical blowing agents are particularly effective at lowering the viscosity to a desired level for the methods of the present invention. According to one preferred embodiment, the blowing agent is carbon dioxide. In another preferred embodiment the blowing agent is nitrogen. In certain embodiments, the blowing agent is solely carbon dioxide or nitrogen. In preferred methods, carbon dioxide and nitrogen blowing agents are in the supercritical state within the extruder.

Blowing agent may be introduced into the polymeric material to provide a mixture having the desired weight percentage for a particular process. The weight percentage of blowing agent may depend upon a number of variables including the selected viscosity reduction and the desired void fraction of the polymeric material in the in-mold decorated article. Generally, increasing the weight percentage of blowing agent in a mixture will further decrease the viscosity. The blowing agent percentage is typically less than about 15% by weight of the mixture of polymeric material and blowing agent. In some embodiments, the blowing agent level is less than about 8% and in some embodiments less than about 5%. In some cases, it may be preferable to use low weight percentages of blowing agent. For example, the blowing agent level may be less than about 3%, in others less than about 1% and still others less than about 0.1% by weight of polymeric material and blowing agent mixture. The blowing agent weight percentage may also depend upon the type of blowing agent used. For example, to achieve the same reduction in viscosity, carbon dioxide typically has to be added at greater amounts than nitrogen.

The blowing agent introduction rate may be coupled to the flow rate of polymeric material to produce a mixture having the desired weight percentage of blowing agent. Blowing agent may be introduced into the polymeric material over a wide range of flow rates. In some embodiments, the blowing agent mass flow rate into the polymeric material may be between about 0.001 lbs/hr and about 100 lbs/hr, in some cases between about 0.002 lbs/hr and about 60 lbs/hr, and in some cases between about 0.02 lbs/hr and about 10 lbs/hr.

Figure 3:
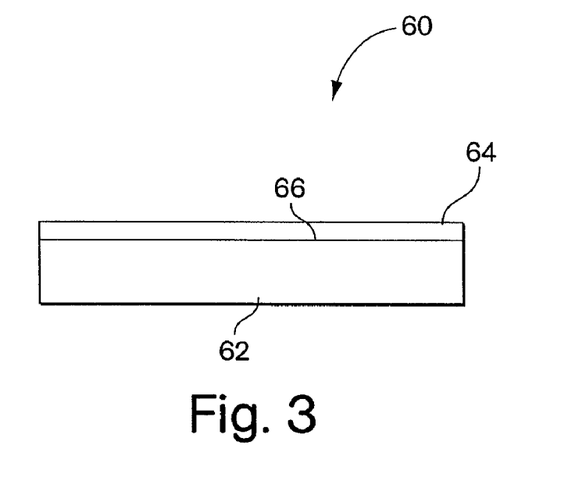
FIG. 3 schematically illustrates an in-mold decorated article according to one embodiment of the present invention.

Referring to FIG. 3, an in-mold decorated article 60 produced according to a method of the present invention is schematically illustrated. Article 60 includes a polymeric material portion 62 and a substrate portion 64 adhered to a surface 66 of the polymeric material portion. As described above, substrate 64 is molded integral with the polymeric material portion and, thus, no external adhesive is required to adhere the portions together. In-mold decorated article 60 may be used in any number of applications including automotive, furniture, packaging, cosmetic, business equipment, and communication applications.

Polymeric material portion 62 generally may comprise any type of polymeric material used in the art. Suitable materials include thermoplastic polymers which may be amorphous, semicrystalline, or crystalline materials. Typical examples of polymeric materials used to form portion 62 include styrenic polymers (e.g., polystyrene, ABS), polyolefins (e.g., polyethylene and polypropylene), fluoropolymers, polyamides, polyimides, polyesters, and the like. Substrate 64 generally may be any type of substrate used in the art to form in-mold decorated articles. Examples of substrates materials include fabrics, carpets, sheets, films such as plastic or metal films, and the like.

Because the method of the present invention permits lower injection pressures and temperatures, a wider range of plastic material and substrate combinations may be utilized than with certain conventional in-mold decorating techniques. For example using certain conventional techniques, the high temperatures and pressures required to process certain polymeric materials cause damage to certain substrate materials (e.g., distortion or rupture). Relatively lower temperatures and pressures used in the methods of the present invention permit greater options for substrate materials selection. Polymeric substrate materials having a softening temperature similar to the softening temperature of the polymeric material portion may be utilized. For example, the softening temperature of the substrate may be within than 20° C. of the softening temperature of the polymeric material, in some cases within than 10° C. of the softening temperature of the polymeric material, and in some cases substantially equal to the softening temperature of the polymeric material. As used herein, "softening temperature" is defined as the melting temperature ($T_m$) for crystalline polymers and as the glass transition temperature ($T_g$) for amorphous plastics. In some embodiments, in-mold decorated article 60 may include a substrate material 64 and a polymeric portion 62 each of which comprise the same polymeric component. For example, the substrate material and the polymeric material may each be made of polypropylene. Also, the substrate material may be made of acrylonitrile-butadiene-styrene (ABS) and the polymeric material may be made of polystyrene.

Polymeric material portion 62 is generally a foam material which includes a plurality of cells formed within a polymer matrix. In these cases, the blowing agent causes the nucleation and growth of the cells. However, in other cases, plastic material portion 62 may be a solid plastic without any cells. In these cases, the blowing agent functions only as a viscosity lowering aid and does not nucleate and grow cells.

In embodiments in which the polymeric material portion is a foam material, the foam may have a wide range of void fractions. Polymeric foams may be used that have a void fraction of between about 1% and about 99%. In some embodiments, higher density foams are used having a void fraction of less than 50%, in other cases a void fraction of less than 30%, and in some cases a void fraction of between about 5% and about 30%. The particular void fraction will depend upon the application.

In certain embodiments, the plastic material portion may be a microcellular material. Microcellular foams, or microcellular materials, have small cell sizes and high cell densities. As used herein, the term "cell density" is defined as the number of cells per cubic centimeter of original, unexpanded polymeric material. In some embodiments, the microcellular materials have an average cell size of less than 100 microns; in other embodiments, an average cell size of less than 75 microns; in other embodiments, an average cell size of less than 50 microns; in other embodiments, an average cell size of less than 25 microns; and, in still other embodiments, an average cell size of less than 10 microns. In some of these microcellular embodiments, the cell size may be uniform, though a minority amount of cells may have a considerably larger or smaller cells size. In some cases, the microcellular materials have a cell density of greater than $10^6$ cells/cm$^3$, in others greater than $10^7$ cells/cm$^3$, in others greater than $10^8$ cells/cm$^3$, and in others greater than $10^9$ cells/cm$^3$.

In another set of embodiments, in-mold decorated article 60 includes a polymeric foam portion 62, wherein at least 70% of the total number of cells in the polymeric portion have a cell size of less than 150 microns. In some embodiments at least 80%, in other cases at least 90%, in other cases at least 95%, and in other cases at least 99% of the total number of cells have a cell size of less than 150 microns. In other embodiments, the foam portion may be provided in which at least 30% of the total number of cells have a cell size of less than 800 microns, more preferably less than 500 microns, and more preferably less than 200 microns.

In certain cases, polymeric material portion 62 may be a foam having a non-uniform cell size. In some of these cases, different regions of portion 62 may have cells of different size. For example, edge regions of portion 62 may generally have a smaller cell size than interior regions of portion 62.

Polymeric material portion 62, as described above, is processed using a physical blowing agent and, thus, is generally free of residual chemical blowing agents or reaction byproducts of chemical blowing agents. Optionally, the polymeric material may include a nucleating agent, such as talc or calcium carbonate. In other embodiments, polymeric material portion 62 may be free of a nucleating agent. Polymeric material portion 62 may also include any number of other additives known in the art such as lubricants, plasticizers, colorants, fillers and the like.

Polymeric material portion 62 may be formed over a wide variety of thicknesses depending upon the particular application. In some cases, the thickness may be less than 0.5 inches. In other cases, relatively thin polymeric material portions are produced, for example, having a thickness of less than 0.2 inches and, in other cases, less than 0.1 inches. The reduction of viscosity of polymeric material via the addition of the blowing agent permits formation of thin polymeric material portion and polymeric portions having large length-to-thickness ratios (l/t). As used herein, "l/t ratio" is defined as the ratio of the length of extension of a section of polymeric portion extending away from an injection location (gate) in the mold and the average thickness across that length. In some cases, polymeric material portion has an l/t ratio of greater than 50:1, in other cases greater than 100:1, and in still other cases greater than 200:1.

Substrate portion 64 may be any of the type used in the art and is selected for the particular application of the in-mold decorated article. Substrate portion 64 may include decorative features such as a design, print, or other indicia. In some cases, the decorative features are formed using ink which is applied to the substrate surface. In other cases, the decorative features are created during the molding process. Substrate portion 64 may be colored, clear, shiny, and the like. When the substrate is a fabric, it may have any fabric pattern known in the art.

When desired, substrate portion 64 may include only a single layer even when the substrate is a fabric material. In these embodiments, no additional layer (e.g., a separate barrier layer or a backing layer) separates the fabric substrate portion 64 from polymeric material portion 62. Conventional techniques generally employ a barrier layer, such as a finely knit textile or plastic layer, which prevents polymer from bleeding through under typical injection conditions. Because low pressures may be utilized in the present method, as described above, such barrier layers are not required. Substrate portion 64 may also be thin, even when fabric substrates are utilized. For example, substrate portion 64 may have a thickness of less than 0.01 inches.

The function and advantages of these and other embodiments of the present invention will be more fully understood from the examples below. The following examples are intended to illustrate the benefits of the present invention but do not exemplify the full scope of the invention.

EXAMPLE 1

Production of In-Mold Decorated Article Including Polymeric Portion and Fabric Substrate An injection molding machine (Engel—500 ton) was modified to have a configuration similar to the system illustrated in FIGS. 1A-1C. A two cavity pillar mold was used. The mold contained 3 gates per cavity and a hot runner system with 9 control zones.

A fabric including a suede layer with a non-woven cotton backing was placed within each mold cavity. The suede layer had a thickness of about 0.850 inches and the backing had a thickness of about 0.160 inches to give a total fabric thickness of about 0.245 inches. Polymeric pellets having a PC/ABS composition (GE Plastics Cycoloy MC 2231) were fed into the molding machine using the hopper. Trials were run using a variety of different blowing agent conditions, gate configurations, injection speeds, barrel temperatures, and hydraulic pressures. The conditions were summarized in Table 1.

TABLE 1

| | | Processing conditions | | |
|---|---|---|---|---|
| Blowing Agent (Type - Wt. %) | # of Gates | Injection Speed (inch/sec) | Barrel Temperature (° C.) | Hydraulic Pressure (psi) |
| Solid - 0% | 3 | 2 | 271 | 2320 |
| Solid - 0% | 3 | 0.5 | 271 | 2194 |
| $N_2$ - 0.5% | 3 | 0.8 | 249 | 2291 |
| $CO_2$ - 2% | 3 | 0.7 | 249 | 1745 |
| $CO_2$ - 3.4% | 3 | 0.7 | 249 | 1697 |
| $CO_2$ - 3.7% | 3 | 1.0 | 249 | 1455 |
| $CO_2$ - 3.1% | 1 | 1.8 | 249 | 2205 |

In-mold decorated automotive pillars having a polymeric ABS/PC portion adhered to the fabric substrate were produced. The pillars had a curved cross-section, a length of about 24 inches, and a thickness of about 0.10 inches. The in-mold decorated articles produced using blowing agent ($CO_2$ and $N_2$) had a void fraction of between about 0.05 and 0.14.

The use of blowing agent reduced the hydraulic pressures and barrel temperatures which were used to produce the in-mold decorated articles. The reduction in hydraulic pressure was indicative of a reduction in injection pressure and the reduction in barrel temperature was indicative of a reduction in injection temperature. The reduction in hydraulic pressure was achieved even while increasing the injection speed, which at a fixed blowing agent percentage, would otherwise be expected to increase hydraulic pressure.

This example illustrates the effectiveness of the method of the invention for producing an in-mold decorated article at low injection pressures and temperatures.

EXAMPLE 2

Production of In-Mold Decorated Article Including Polymeric Material and Fabric Substrate Without a Barrier Layer An injection molding machine (Milacron—400 ton) was modified to have a configuration similar to the system illustrated in FIGS. 1A-1C. A pillar mold was used. The mold contained 3 gates and a hot runner system with 6 control zones. Only 1 gate was utilized in the experimentation.

A single layer polypropylene fabric with no backing or separate barrier layer was placed within the mold cavity. The fabric had a thickness of about 0.010 inches. Polymeric pellets having a PP composition which included 20% talc by weight (Mitsui Plastics TS0P5, 30 MFR) were fed into the molding machine using the hopper. Trials were run using different blowing agent conditions, barrel temperatures, and hydraulic pressures. The conditions were summarized in Table 2.

TABLE 2

| Blowing Agent (Type - Wt. %) | Process Conditions | | |
|---|---|---|---|
| | Barrel Temperature (° C.) | Injection Speed (inch/sec) | Hydraulic Pressure (psi) |
| Solid - 0% | 204 | 1.0 | 1550 |
| $N_2$ - 0.5% | 193 | 1.0 | 1420 |

When no blowing agent was used, polymeric material bled through the fabric substrate. Thus, the in-mold decorated article produced without blowing agent was unacceptable.

Figure 4:
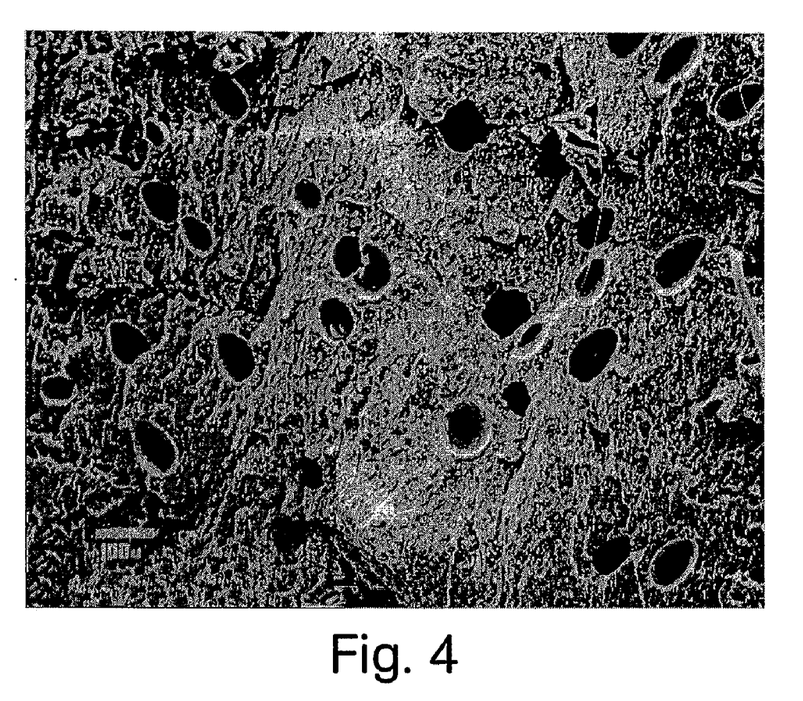
FIG. 4 is an SEM photo of the microstructure of the polymeric material portion of the in-mold decorated article produced in Example 1.

In-mold decorated automotive pillars having a polymeric PP portion adhered to the fabric substrate were produced using blowing agent ($N_2$). No polymeric material bled through the fabric when blowing agent was used. The pillars had a curved cross-section, a length of about 30 inches, and a thickness of about 0.20 inches. The pillars produced using blowing agent ($N_2$) had a void fraction of about 0.14. The polymeric portion of the in-mold decorated pillars produced using blowing agent ($N_2$) was a microcellular material having an average cell size of about 50 microns. FIG. 4 is an SEM photo showing the microstructure of a typical cross-section of the microcellular material of the in-mold decorated article.

The use of blowing agent reduced the hydraulic pressure and barrel temperature which were used to produce the in-mold decorated articles. The reduction in hydraulic pressure was indicative of a reduction in injection pressure and the reduction in barrel temperature was indicative of a reduction in injection temperature.

This example illustrates the effectiveness of the method of the invention for producing an in-mold decorated article including a single fabric substrate without a barrier layer due to reductions in injection pressure and temperature. Furthermore, this example illustrates the production of an in-mold decorated article including a microcellular polymeric portion.

Those skilled in the art would readily appreciate that all parameters listed herein are meant to be exemplary and that the actual parameters would depend upon the specific application for which the methods and articles of the invention are used. It is, therefore, to be understood that the foregoing embodiments are presented by way of example only and that, within the scope of the appended claims and equivalence thereto, the invention may be practiced otherwise than as specifically described.

The invention claimed is:

1. A method for forming an in-mold decorated article comprising:
   providing a substrate within a mold cavity; and
   injecting a mixture of a thermoplastic polymeric material and blowing agent into the mold cavity to form an in-mold decorated article in the mold cavity, the article including a microcellular thermoplastic polymeric material portion adhered to the substrate, the microcellular thermoplastic polymeric material portion including a thickness of less than 0.100 inch and having an average cell size of less than 100 microns,
   wherein the substrate has a thickness of less than 0.01 inches.

2. The method of claim 1, further comprising introducing a physical blowing agent into the polymeric material to form the mixture of polymeric material and blowing agent.

3. The method of claim 2, comprising mixing the blowing agent and the polymeric material under conditions at which the blowing agent is a supercritical fluid.

4. The method of claim 1, wherein the blowing agent comprises carbon dioxide.

5. The method of claim 1, wherein the blowing agent comprises nitrogen.

6. The method of claim 1, wherein the mixture is a single-phase solution of polymeric material and blowing agent.

7. The method of claim 1, wherein the substrate has a single layer.

8. The method of claim 1, wherein the substrate comprises a fabric material.

9. The method of claim 8, wherein the substrate comprises a single layer fabric material having a thickness of less than 0.01 inches.

10. The method of claim 1, wherein the substrate comprises a plastic film.

11. The method of claim 1, wherein the polymeric material comprises polypropylene and the substrate comprises polypropylene.

12. The method of claim 1, wherein the polymeric material comprises acrylonitrile-butadiene-styrene and the substrate comprises polystyrene.

13. The method of claim 1, wherein the microcellular polymeric material has an average cell size of less than 50 microns.

14. The method of claim 1, wherein the substrate includes decorative features.

15. The method of claim 1, wherein the microcellular polymeric material portion is adhered to a back surface of the substrate.

16. The method of claim 1, wherein the microcellular polymeric material portion is adhered to the substrate in the absence of an external adhesive.

17. The method of claim 6, wherein the single-phase solution is nucleated at a rate sufficient to form microcellular material as a result of a pressure drop while being injected into the mold cavity.

18. The method of claim 1, wherein the substrate is flexible.

19. The method of claim 1, wherein the substrate is forced against a wall of the mold cavity when the mixture is injected into the mold cavity.

20. The method of claim 1, further comprising processing the mixture in an extruder prior to injecting the mixture into the mold cavity.

* * * * *